United States Patent [19]

Katase et al.

[11] Patent Number: 6,037,403
[45] Date of Patent: Mar. 14, 2000

[54] HIGH VISCOSITY FLUID COMPOSITION AND VIBRATION ENERGY DAMPING DEVICE UTILIZING THE SAME

[75] Inventors: Haruhisa Katase, Yokohama; Sakae Kanai, Hiratsuka, both of Japan

[73] Assignee: Nippon Petrochemicals Company Limited, Tokyo, Japan

[21] Appl. No.: 08/873,776

[22] Filed: Jun. 12, 1997

[51] Int. Cl.$^7$ .................................................. C08L 91/06
[52] U.S. Cl. .............................. 524/579; 252/73; 252/74; 252/572
[58] Field of Search .............................. 524/579; 252/73, 252/74, 572

[56] References Cited

U.S. PATENT DOCUMENTS

| | | | |
|---|---|---|---|
| 3,385,817 | 5/1968 | Jones | 524/579 |
| 4,624,983 | 11/1986 | Jarzombek et al. | 524/579 |

FOREIGN PATENT DOCUMENTS

| | | | |
|---|---|---|---|
| 47-42927 | 10/1972 | Japan | 524/579 |
| 50-43730 | 4/1975 | Japan . | |
| 51-66137 | 6/1976 | Japan . | |
| 53-76532 | 7/1978 | Japan . | |
| 54-54425 | 4/1979 | Japan . | |
| 55-111507 | 8/1980 | Japan . | |
| 58-76361 | 5/1983 | Japan . | |
| 60-31550 | 2/1985 | Japan | 524/579 |
| 62-9045 | 1/1987 | Japan . | |
| 63-23436 | 5/1988 | Japan . | |
| 1-55446 | 3/1989 | Japan . | |
| 2-47477 | 2/1990 | Japan . | |
| 3-63361 | 3/1991 | Japan . | |
| 4-38867 | 6/1992 | Japan . | |
| 5-59703 | 3/1993 | Japan . | |
| 5-86744 | 4/1993 | Japan . | |
| 5-67819 | 9/1993 | Japan . | |
| 5-332008 | 12/1993 | Japan . | |

OTHER PUBLICATIONS

Encyclopedia of Polymer Science and Engineering, vol. 7, pp. 53–62 (1987).

*Primary Examiner*—Bernard Lipman
*Assistant Examiner*—N. Sarofim
*Attorney, Agent, or Firm*—Fisher, Christen & Sabol

[57] ABSTRACT

A high viscosity fluid composition having a specific gravity of 1 or more, the physical properties of said fluid composition is not impaired for the use of a long period of time, and a vibration energy damping device which is filled with said high viscosity fluid composition. The high viscosity fluid composition comprises a high viscosity hydrocarbon fluid and an inorganic filler.

40 Claims, 1 Drawing Sheet

HIGH VISCOSITY FLUID COMPOSITION AND VIBRATION ENERGY DAMPING DEVICE UTILIZING THE SAME

BACKGROUND OF THE INVENTION (1) Field of the Invention

The present invention relates to a high viscosity fluid composition used for a vibration energy damping device such as a seismic damping wall and a vibration energy damping device which is filled with the high viscosity fluid composition.

(2) Prior Art

It is very important to suppress the vibration induced by sudden and unexpected causes such as wind or an earthquake for the purpose of preventing the occurrence of disasters due to upsetting or falling of furniture, facilities, equipment or the like in a building or due to collision of persons with various objects and further to suppress the usual ground shakes induced by the traffic vehicles on a bridge and high-level road for the purpose of ensuring safety of workers engaging in the construction work and preventing them from altitude sickness. In these circumstances, various vibration energy damping device have recently been developed to absorb and reduce the vibration energy of wide range from slight vibrations to the level of an earthquake.

The damping device of this kind is exemplified by seismic damping walls used in construction work for buildings, which are disclosed in the Japanese Patent Publication No. 4-38867 and Japanese Laid-Open Patent Publication No. 5-86744. Besides these, other examples of damping devices include earthquake-proof and vibration isolating floors applied to buildings such as research laboratories, computer rooms and buildings for nuclear power plant equipment, in which not only the vibrations induced by an earthquake but also slight vibrations caused by the operation of instruments or any slight vibrations accompanied by the movement of persons or machines are avoided. The damping devices are further exemplified by those for girder based structures such as bridges and overhead roads, mounting devices for automobile engines and support members for fixing pipes.

These devices are filled with a high viscosity fluid mixture and are able to absorb and reduce vibration energy by the sheer resistance due to its viscosity.

The specific gravity of the high viscosity fluid mixtures used in the prior art are less than 1, thus when rainwater or condensed water enters into a vibration energy damping device such as a seismic damping wall, it may be collected in the bottom part of the device, so that it is apprehended that the properties of the high viscosity fluid mixture such as tackiness and viscosity. In order to remove the water, it is considered as a countermeasure to form openings in the bottom part of the seismic damping wall.

However, when the water is removed from openings, it is difficult to remove only the water. In addition, another problem is caused to occur in that the openings formed in the seismic damping wall may reduce the mechanical strengths of the seismic damping wall itself. Furthermore, maintenance and inspection works such as periodical inspection of the seismic damping wall to check up the existence of mingled water and to replenish the reduced high viscosity fluid mixture is inevitable after the installation of the seismic damping wall.

BRIEF SUMMARY OF THE INVENTION

It is, therefore, the object of this invention to provide a high viscosity fluid composition used for a vibration energy damping device, the specific gravity of which composition is more than 1 and the original physical properties may be retained without being deteriorated even upon long duration of use. Further, the invention provides a vibration energy damping device using the same fluid composition.

The first aspect of the present invention relates to a high viscosity fluid composition for a vibration energy damping device, which composition is characterized in that it comprises a high viscosity fluid of hydrocarbons (A) and an inorganic filler (B).

A second aspect of the present invention relates to a high viscosity fluid composition for a vibration energy damping device as specified in the above first aspect, the specific gravity of which composition is 1 or more.

A third aspect of the present invention relates to a high viscosity fluid composition for vibration energy damping device as specified in the above first and second aspects in which the above-mentioned component (A) is polybutenes.

A fourth aspect of the present invention relates to a high viscosity fluid composition for vibration energy damping device as specified in the above first and second aspects in which the above-mentioned component (A) contains a low molecular weight polybutene with a number average molecular weight ranging from 1,000 to 4,000 and polybutene with a number average molecular weight larger than 4,000.

A fifth aspect of the present invention relates to a high viscosity fluid composition for vibration energy damping device as specified in the above first and second aspects in which the above-mentioned component (A) a low molecular weight polybutene with a number average molecular weight ranging from 1,000 to 4,000, an intermediate molecular weight polybutene with a viscosity average molecular weight ranging from 20,000 to 70,000 and a high molecular weight polybutene with a viscosity average molecular weight ranging from 900,000 to 2,100,000.

A sixth aspect of the present invention relates to a high viscosity fluid composition for vibration energy damping device as specified in any of the above first to fifth aspects, in which the above-mentioned component (B) is an inorganic filler having a specific gravity of 3 or more.

A seventh aspect of the present invention relates to a high viscosity fluid composition for vibration energy damping device as specified in any of the above first to sixth aspects, in which the high viscosity fluid composition contains an antioxidant.

An eighth aspect of the present invention relates to a vibration energy damping device which is filled with a high viscosity fluid composition comprising a high viscosity fluid of hydrocarbon (A) and an inorganic filler (B) and utilizing the shear resistance due to the viscosity of the composition.

BRIEF DESCRIPTION OF DRAWINGS

These and other objects and features of the present invention will become more apparent from the following description taken in connection with the accompanying drawings in which.

DETAILED DESCRIPTION OF THE INVENTION

Figure 1:
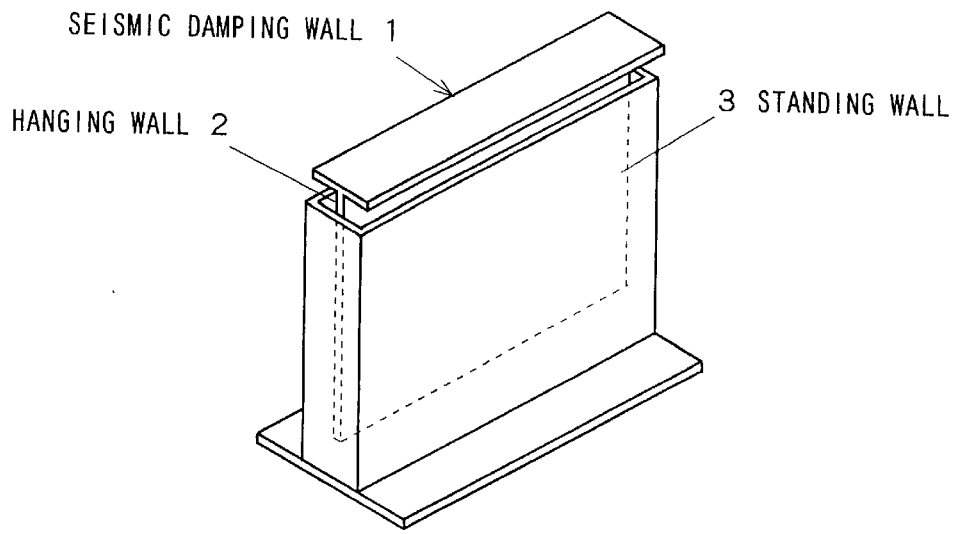
FIG. 1 is a schematic illustration in perspective view of an embodiment of a seismic damping wall according to the present invention.

The present invention will be described in more detail in the following.

As described above, the high viscosity fluid composition for the vibration energy damping device (hereinafter referred to as "a high viscosity fluid composition") in accordance with the present invention comprises a high viscosity hydrocarbon fluid (A) and an inorganic filler (B).

There is any particular limit on the viscosity of the high viscosity hydrocarbon fluid as the component (A) to be used in this invention as long as it has a sufficiently high viscosity. A hydrocarbon which has a viscosity of 1,000 to 100,000 Pa·s at room temperature may be exemplified as a suitable high viscosity hydrocarbon fluid.

Examples of such hydrocarbons include saturated aliphatic hydrocarbons or alicyclic hydrocarbons such as normal paraffin, iso-paraffin, liquid paraffin, naphthene, and polyolefin hydrocarbons. More specifically, oligomers of olefins such as ethylene, propylene and butene, atactic polypropylene, polybutene, their mixtures are included. Furthermore, the hydrogenated compounds of them are also included.

These hydrocarbons are suitable as high viscosity hydrocarbon fluids to be used because they do not cause to occur the corrosion of structural members of the vibration energy damping device, they are hardly deteriorated and the change in their viscosity coefficients with temperature variation is small. Among these, particularly suitable one is polybutene which is remarkably chemically stable and nontoxic to human body coupled with excellent water resistance, moisture resistance and aging resistance.

The above-described polybutenes includes, homopolymer of isobutylene which is prepared by the selective polymerization of isobutylene with friedel-crafts catalyst such as aluminum chloride or boron trifluoride, which isobutylene is obtained from $C_4$ fraction in the naphtha cracking process or fluidized bed catalytic cracking process of petroleum refining or the copolymer of the main component of isobutylene with butene as well as the homopolymer of isobutylene prepared from purified isobutylene can be used as a raw material.

A example of preferred composition of the polybutene may be composed of a plurality of polybutene having different molecular weights. More particularly, the polybutene composition comprises a low molecular weight polybutene having a number average molecular weight of 1,000 to 4,000 and the polybutene having a number average molecular weight larger than 4,000.

Furthermore, exemplified as the polybutene composition is the one comprising a low molecular weight polybutene having a number average molecular weight of 1,000 to 4,000, an intermediate molecular weight polybutene having a viscosity average molecular weight (Flory method) of 20,000 to 70,000 and a high molecular weight polybutene having a viscosity average molecular weight (Flory method) of 900,000 to 210,000. The term "high molecular weight polybutene" used herein means those equivalent to polyisobutylene.

In the above-described composition, the flowability is imparted by the low molecular weight polybutene component and the tackiness and viscosity are imparted by the intermediate and high molecular weight polybutenes.

The composition contains 10 to 350 parts by weight, preferably 30 to 200 parts by weight, of the low molecular weight polybutene and 0.1 to 50 parts by weight, preferably 1 to 40 parts by weight of the high molecular weight polybutene relative to 100 parts by weight of the intermediate molecular weight polybutene. If the content of low molecular weight polybutene is less than 10 parts by weight, the composition may have poor flowability. If the content of the low molecular weight polybutene is larger than 350 parts by weight, the composition may have improved flowability but its tackiness and viscosity are impaired. So that, both the cases are not desirable. Meanwhile, the composition in which the high molecular weight polybutene content is larger than 50 parts by weight, may unfavorably have excessive tackiness and viscosity.

The inorganic fillers of component (B) to be used in this invention is aimed to increase the specific gravity of the high viscosity fluid composition to a level larger than 1. The inorganic filler having a specific gravity of 3 or higher, particularly higher than 5, is preferable. The inorganic filler having a specific gravity of lower than 3 necessitates to increase their addition quantity to the polybutenes, in which it is not desirable in that the dispersing property is lowered and the viscosity is seriously lowered in the high viscosity fluid composition.

The inorganic fillers to be used in this invention are exemplified by mica, asbestos, silicon carbide, silicon nitride, magnesium oxide, lithopone, alumina, antimony trioxide, zinc oxide, chromium oxide, stannous oxide, stannic oxide, tungsten dioxide, tungsten trioxide, zirconia, cerium oxide, ferric oxide, cuprous oxide, cupric oxide, molybdenum dioxide, molybdenum disulfide, bismuth trioxide, titanium oxide, titanium iron oxide, tantalum oxide, barium titanate, lead monooxide, barium sulfate, barium carbonate and zirconium silicate.

Among these fillers, zinc oxide is preferable in view of handling, safety to a human body and cost problems. Furthermore, when it is needed to impart flame resistance to the high viscosity fluid composition, it can be accomplished by adding a flame retardant inorganic filler such as antimony trioxide.

The average particle size of the inorganic fillers is preferably 1 μm or smaller. The inorganic fillers with an average particle size of larger than 1 μm is not preferable because it causes problems such as poor dispersion and rapid precipitation in a short period of time.

The amount of the inorganic fillers to be add is 1 to 50 parts, preferably 5 to 45 parts by weight, relative to 100 parts by weight of the high viscosity hydrocarbon fluid. If the addition quantity of the inorganic filler exceeds 50 parts by weight, it is not desirable because the viscosity of the high viscosity hydrocarbon fluid is markedly lowered.

It is possible to add a antioxidant to the high viscosity hydrocarbon fluid (A) in the present invention. Any known antioxidant used for hydrocarbons may be effective. Examples of such antioxidants include monophenol antioxidants such as 2,6-di-tert-butyl-p-cresol (BHT), butylated hydroxyanisole (BHA), 2,6-di-tert-butyl-4-ethylphenol, and stearyl-β-(3, 5-di-tert-butyl-4-hydroxyphenyl)-propionate;

bisphenol antioxidants such as 2,2-methylene bis(4-methyl-6-tert-butylphenol), 2,2'-methylenebis-(4-ethyl-6-tert-butylphenol), 4,4'-thiobis(3-methyl-6-tert-butylphenol), 4,4'-butylidenebis(3-methyl-6-tert-butylphenol), and 3,9-bis[1,1-dimethyl-2-{β-(3-tert-butyl-4-hydroxy-5-methylphenyl)propionyloxy}ethyl]2,4,8,10-tetraoxaspiro [5,5] undecane;

high polymer phenol antioxidants such as 1,1,3-tris(2-methyl-4-hydroxy-5-tert-butylphenyl)butane, 1,3,5- trimethyl-2,4,6-tris(3,5-di-tert-butyl-4-hydroxybenzyl) benzene, tetrakis[methylene-3-(3',5'-di-tert-butyl-4'-hydroxyphenyl)propionate]methane, bis[3,3'-bis(4'-hydroxy-3'-tert-butylphenyl) butyric acid] glycol ester, 1,3,5-tris(3',5'-di-tert-butyl-4'-hydroxybenzyl)-S-triazine2,4,6-(1H,3H,5H)trione, and tocopherol;

sulfur-containing antioxidants such as dilauryl-3,3'-thiodipropionate, dimyristyl-3,3'-thiodipropionate, and distearyl-3-3'-thiodipropionate;

phosphorus-containing antioxidants such as triphenylphosphite, diphenylisodecylphosphite, 4,4'-butylidene-bis(3-methyl-6-tert-butylphenylditridecyl) phosphite, cyclic neopentanetetrayl bis (octadecylphosphite), tris(nonylphenyl)phosphite, tris (monononylphenyl)phosphite, tris(dinonylphenyl) phosphite, diisodecylpentaerythritol diphosphite, 9,10-dihydro-9-oxa-10-phosphorphenathrene-10-oxide, 10-(3,5-di-tert-butyl-4-hydroxybenzyl)-9,10-dihydro-9-oxa10-phosphorphenanthrene-10-oxide, 10-decyloxy-9,10-dihydro-9-oxa-10-phosphorphenathrene, tris(2,4-di-tert-butylphenyl)phosphite, cyclic neopentane tetraylbis(2,4-di-tert-butylphenyl) phosphite, cyclic neopentanetetraylbis(2,6-di-tert-butyl-4-methylphenyl) phosphite, and 2,2-methylenebis(4,6-di-tert-butyl-4-butylpheny) octylphosphite.

The addition quantity of the antioxidant is in the range of 0.01 to 10 parts by weight against 100 parts by weight of the high viscosity hydrocarbon fluid. When it is less than 0.01 parts by weight, the effect of addition can hardly be expected, meanwhile when it is more than 10 parts by weight, not only any additional effect cannot be produced but only the cost is increased, which are not desirable.

Fatty acids, their metallic salts and amines such as stearic acid, calcium stearate, zinc stearate, barium stearate, aluminum stearate and stearylamide may be added to the high viscosity fluid composition in an amount within the range where the advantages of the present invention are not impeded.

The high viscosity fluid composition of the present invention can be prepared using mixers such as kneader, roll mixer and Banbury mixer. The mixing procedure using the mixer involves, for example, feeding required amount of high viscosity hydrocarbon fluids and inorganic fillers, and if required, antioxidants to the mixer and mixing them. The order to feed the respective components is not particularly limited. There is no limitation in the mixing temperature and mixing time length and it is desirable to carry out the mixing operation until a satisfactorily uniform mixture is obtained.

The high viscosity fluid compositions of the present invention prepared by the above described procedure have a specific gravity of higher than 1. Therefore, rainwater or condensed water does not enter into a vibration energy damping device. In addition, the fluid composition can retain almost constant tackiness and viscosity over the wide temperature range around room temperature without deterioration even for a long period of use.

The vibration energy damping device filled with the high viscosity fluid composition of the invention includes any vibration energy damping device which utilizes the shear resistance owing to the viscosity of the high viscosity fluid to damp vibration energy.

An example of such vibration energy damping device comprises a concave portion which is directly or indirectly fixed to the floor surface of buildings secured to the ground surface, a convex portion which is directly or indirectly fixed to the surface isolated from the floor surface to which said concave portion is fixed, and the high viscosity fluid composition of the present invention which is filled in the concave portion and surrounding the convex portion. With the vibration energy damping device, the vibration energy imparted to either or both the surfaces to which the concave portion or the convex portion is fixed can be damped by the shear resistance due to the viscosity generated between the surface of the convex portion and the high viscosity fluid composition.

The examples of such vibration energy damping devices include, as previously stated, seismic damping walls, seismic damping floors and vibration absorbing devices.

The seismic damping wall will be described with reference to the accompanying drawings.

FIG. 1 is a schematic perspective view of an embodiment of the seismic damping wall according to the present invention. The seismic damping wall 1 of the vibration energy damping device is composed of a hanging wall 2 and a plurality of standing walls 3. A high viscosity fluid composition is filled in the space between the hanging wall or walls 2 formed of one or a plurality of panel and the standing walls. The upper end of the hanging wall 2 is attached to and hung down from the frame of upper building structure but isolated from the frame of lower building structure. The standing walls 3 are fixed to the frame of lower building structure and stand vertically and parallel to the hanging wall so that they surround the hanging wall but they are isolated from the frame of upper building structure.

As the materials to form the hanging wall 2 and the standing walls 3 of the seismic damping wall 1, fiber reinforced plastics plates as well as steel plates can be used. The plastics plates are made by combining a reinforcing fiber material such as glass fibers, carbon fibers, boron fibers, alumina fibers and aramid fibers, and a matrix resin of a thermosetting resins such as unsaturated polyester resin and epoxy resin.

As more specific examples of the structures of seismic damping walls, Japanese Patent Publication No. 4-38867 proposes a seismic damping wall in which openings for bolts are formed in the hanging and standing wall in the horizontal and vertical directions with leaving certain spaces and gap adjusting bolts which define the clearance between the hanging wall and standing wall are set to the openings and fixed by nuts, thereby adjusting the clearance between both the walls with the length of the gap adjusting nuts. While, Japanese Laid-open Patent Publication No. 5-86744 discloses a seismic damping wall in which a reservoir for a viscous material is formed in an upper end or side portion in the space between walls.

The high viscosity fluid composition is filled into the seismic damping wall before or after inserting the hanging wall between the standing walls using any appropriate method.

As the filling method for the high viscosity fluid composition before inserting the hanging wall, for example, an inlet pipe is inserted from the upper part of the standing walls into the space inside the standing walls and the high viscosity fluid composition is poured in, or a plurality of inlet openings are formed in the lower part of the standing walls and the high viscosity fluid composition is supplied using a pump such as grout injector. After the filling of the high viscosity fluid composition using one of these method, the hanging wall is inserted into the space between the standing walls, thereby completing the construction of the seismic damping wall.

Figure 2:
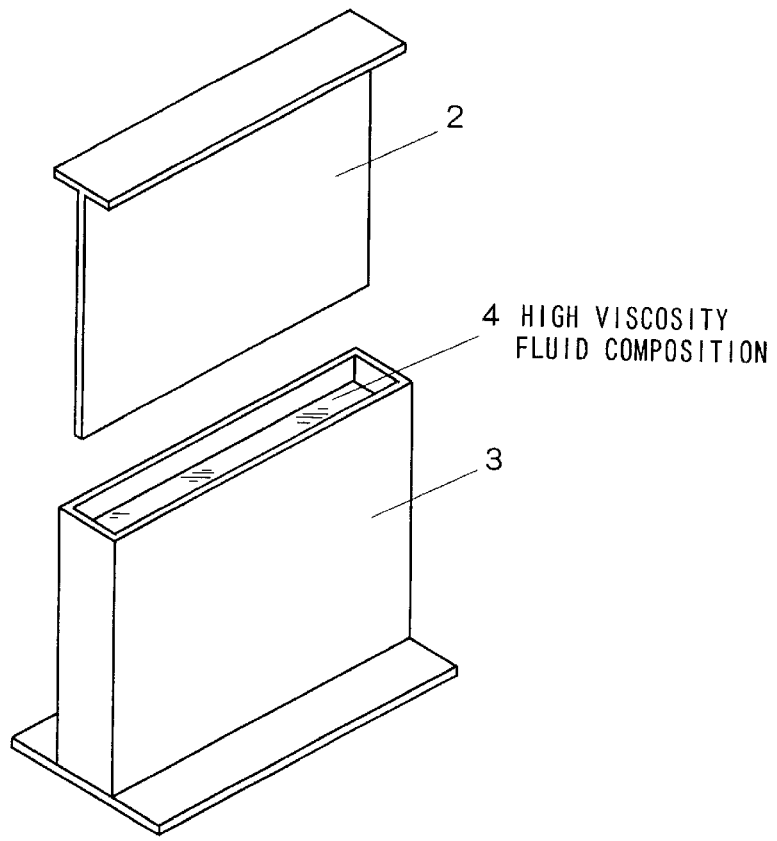
FIG. 2 is a perspective view showing the state before the assembly of the seismic damping wall.

FIG. 2 is a perspective view of the seismic damping wall of FIG. 1 prior to the assembling. In this case, the high viscosity fluid composition is already filled into the space between standing walls.

When the filling of the high viscosity fluid composition is carried out after inserting the hanging wall between the standing walls, it can be carried out with the injection method using the aforementioned inlet openings provided in the lower part of the standing walls.

Meanwhile, with respect to the timing of the filling of the high viscosity fluid composition is optional either to fill the composition in the construction site of the seismic damping wall or to prepare the composition in the construction site and then fill it.

The high viscosity fluid composition in accordance with the present invention can be used with addition of inorganic fillers such as antimony trioxide which provides excellent flame retarding effect. Therefore the filling of such a high viscosity fluid composition into the seismic damping wall enables to provide flame retarding effect to the building materials themselves.

The vibration damping device for girder structures such as bridges and overhead roads is the one which has functions to absorb and reduce live loads acting on the bearing shoes supporting the girder structures or on the girder based structures itself. That is, the deflection of girder structures caused by the vibration of girders due to the running of various vehicles or earthquake loads, are absorbed and weakened, and transmitted to substructures such as piers. Generally, the girders are supported movably or fixedly on abutments or bridge piers. When the deflection or vibration of the girders generated by the running of various type of vehicles is large, the persons who walk on girders are given uneasy feeling. Furthermore, the vibration of the girder is propagated directly through piers and causes ground vibration or it generates extra low frequency air vibration which may induces in turn the vibration of windows or doors of houses in the vicinity of girders, thereby causes secondary noises (as public nuisance) to occur. In order to avoid these uneasy feeling of persons and secondary noises resulting from the vibration of girders, the vibration absorbing devices which are filled with the high viscosity fluid composition are used. Examples of these devices are disclosed in Japanese Laid-Open Patent Publication Nos. 50-43730, 51-66137, 53-76532, 54-54425, 55-111507 and 5-59703.

The purposes of using the vibration damping and isolating floors involve those to prevent various types of buildings such as research laboratories, computer rooms and buildings for nuclear power plant from the effects of earthquakes and vibrations, to avoid vibrations and to support precision machines wherein the vibration is the major cause of machine troubles, to damp and support machines and instruments as vibration generating sources, and to avoid the occurrence of slight vibrations generated by the movement of persons or machines. These devices can produce vibration absorbing and damping effects by being filled with the high viscosity fluid composition. Examples of these devices are disclosed in the Japanese Laid-Open Patent Publication Nos. 62-9045, 1-55446, 2-47477, 3-63361 and 5-332008.

In a mounting device for an automobile engine, the high viscosity fluid composition of the present invention is used for the purpose to damp the low frequency vibration having a large amplitude generated in the starting of an engine (idling) or in the rapid starting of an engine and to reduce the vibration transmitted to a car body. Further, it provides damping action to the low frequency vibration having large amplitude which is generated in a car body due to the ruggedness of roads during running so as to isolate the engine from the vibration to prevent it from the resonance due to the vibration. With regard to the high frequency vibration having small amplitude generated in an engine during high speed running, the vibration is damped and the noise caused by the vibration inside the car is avoided. An example of the device is disclosed in Japanese Patent Publication No. 5-67819.

Meanwhile, the supporting member for pipes is used for the purpose of absorbing vibrations generated by the flowing of a fluid in the pipe or dispersing the vibrations in the piping system resulting from an earthquake-induced ground shaking. It is exemplified by a device described in Japanese Patent Publication No. 63-23436.

In addition, the high viscosity fluid composition of the present invention can be filled into the cushioning and stopping device as described in Japanese Patent Laid-Open Publication No. 58-76361.

As described above, the high viscosity fluid composition in accordance with the present invention can be applied for various vibration energy damping devices. In actual application, the viscosity of the fluid composition is suitably adjusted depending on the conditions of circumstances in which the device is installed. Accordingly, the devices which is filled with the high viscosity fluid composition are able to absorb and reduce wide range vibration energy resulting from an earthquake to ordinary slight vibrations.

EXAMPLES

The present invention will be described in more detail with reference to several examples. In the following description, "part" and "%" are indicated on weight basis unless otherwise specified.

Example 1

To a kneader were fed 100 parts of medium molecular weight polybutene (viscosity average molecular weight: 40,000), 30 parts of high molecular weight polybutene (viscosity average molecular weight: 1,600,000), 30 parts of low molecular weight polybutene (1) (number average molecular weight: 1,400), and 30 parts of low molecular weight polybutene (1) (number average molecular weight: 2,900). Further, 0.5% (per polybutene mixture) of antioxidant of tetrakis[methylene-3-(3',5'-di-tert-butyl-4'-hydroxyphenyl)-propionate]methane (trademark: Irganox 1010, made by Ciba-Geigy Ltd. Co.) and 40% (per polybutene mixture) of an inorganic filler of antimony trioxide (specific gravity: 5.2, average particle size: 0.5 $\mu$m) were fed into the kneader and they were stirred for 30 minutes at room temperature to obtain a uniformly dispersed high viscosity fluid composition. The specific gravity and the viscosity of the resultant composition are shown in Table 1a.

Examples 2 to 6, Comparative Example 1 and 2

The same polybutenes, antioxidant and inorganic filler as used in EXAMPLE 1 were mixed with the proportions indicated in Tables 1a and 1b and the high viscosity fluid compositions were prepared in the like manner as in EXAMPLE 1. While, in COMPARATIVE EXAMPLES, high viscosity fluid compositions corresponding to those in EXAMPLES 1 to 6 were prepared without the use of the inorganic filler. Their specific densities and viscosities are shown also in Tables 1a and 1b.

TABLE 1a

| Materials, etc. | Example 1 | Example 2 | Example 3 | Example 4 |
|---|---|---|---|---|
| Composition | | | | |
| Medium molecular weight polybutene (parts) | 100 | 100 | 100 | 100 |
| High molecular weight polybutene (parts) | 30 | 35 | 5 | 2 |
| Low molecular weight polybutene (1) (parts) | 30 | 135 | 50 | 20 |
| Low molecular weight polybutene (2) (parts) | 30 | 35 | 295 | 35 |
| Antioxidant (% per polybutene mixture) | 0.5 | 0.5 | 0.5 | 0.5 |
| Inorganic filler (% per polybutene mixture) | 40 | 10 | 10 | 20 |
| Specific gravity [15/4° C.] | 1.2 | 1.0 | 1.0 | 1.1 |
| Viscosity [Pa.s] | 50,000 | 40,000 | 4,000 | 13,000 |

TABLE 1b

| Materials, etc. | Example 5 | Example 6 | Comparative Ex. 1 | Comparative Ex. 2 |
|---|---|---|---|---|
| Composition | | | | |
| Medium molecular weight polybutene (parts) | 100 | 100 | 100 | 100 |
| High molecular weight polybutene (parts) | 2 | 3 | 30 | 3 |
| Low molecular weight polybutene (1) (parts) | 20 | 50 | 30 | 50 |
| Low molecular weight polybutene (2) (parts) | 40 | 50 | 30 | 50 |
| Antioxidant (% per polybutene mixture) | 0.5 | 0.5 | 0.5 | 0.5 |
| Inorganic filler (% per polybutene mixture) | 20 | 20 | — | — |
| Specific gravity [15/4° C.] | 1.1 | 1.1 | 0.92 | 0.92 |
| Viscosity [Pa.s] | 8,000 | 7,000 | 4,000 | 500 |

The compositions prepared in the above Examples and Comparative Examples were poured into the seismic damping walls having the structure as shown in the FIG. 1. Water was then poured on each compositions. They were allowed to stand overnight. It was observed that the water was collected in the lower part in the compositions of Comparative Examples and the water was maintained in the upper part in the case of the compositions of Examples.

In addition, according to other experiments, the seismic damping walls of Examples proved to be effective level as seismic damping walls.

ADVANTAGES OF THE INVENTION

One of the advantages of high viscosity fluid composition for vibration energy damping device of the present invention is that rain water or condensed water hardly enters into the vibration energy damping device because the specific gravity is 1 or above, so that periodic maintenance and inspection work after the installation of the device are not necessary. In addition, the high viscosity fluid composition of the present invention possess proper flowability, so that the rapid feeding of the composition into devices is possible. And further, it is able to maintain almost constant tackiness and viscosity over the wide range of temperature around room temperatures and these properties are hardly impeded for the use of long period of time.

What is claimed is:

1. A high viscosity fluid composition used for a vibration energy damping device which comprises a high viscosity hydrocarbon fluid (A) and an inorganic filler (B), wherein said component (A) comprises a plurality of polybutenes having different average molecular weights.

2. A high viscosity fluid composition used for a vibration energy damping device as claimed in claim 1, wherein the specific gravity of said fluid composition is 1 or more.

3. A high viscosity fluid composition used for a vibration energy damping device as claimed in claim 1, wherein said component (A) comprises a low molecular weight polybutene having a number average molecular weight of 1,000 to 4,000 and another polybutene having a number average molecular weight larger than 4,000.

4. A high viscosity fluid composition used for a vibration energy damping device as claimed in claim 1, wherein said component (A) comprises a low molecular weight polybutene having a number average molecular weight of 1,000 to 4,000, a medium molecular weight polybutene having a viscosity average molecular weight of 20,000 to 70,000 and a high molecular weight polybutene having a viscosity average molecular weight of 900,000 to 2,100,000.

5. A high viscosity fluid composition used for a vibration energy damping device as claimed in claim 1, wherein said component (B) is an inorganic filler having a specific gravity of 3 or more.

6. A high viscosity fluid composition used for a vibration energy damping device as claimed in claim 1, wherein said high viscosity fluid composition contains an antioxidant.

7. A vibration energy damping device which is filled with a high viscosity fluid composition comprising a high viscosity hydrocarbon fluid (A) and an inorganic filler (B) and utilizes shear resistance due to the viscosity of said composition.

8. A high viscosity fluid composition used for a vibration energy damping device as claimed in claim 2, wherein said component (A) comprises a low molecular weight polybutene having a number average molecular weight of 1,000 to 4,000 and another polybutene having a number average molecular weight larger than 4,000.

9. A high viscosity fluid composition used for a vibration energy damping device as claimed in claim 2, wherein said component (A) comprises a low molecular weight polybutene having a number average molecular weight of 1,000 to 4,000, a medium molecular weight polybutene having a viscosity average molecular weight of 20,000 to 70,000 and a high molecular weight polybutene having a viscosity average molecular weight of 900,000 to 2,100,000.

10. A high viscosity fluid composition used for a vibration energy damping device as claimed in claim 2, wherein said component (B) is an inorganic filler having a specific gravity of 3 or more.

11. A high viscosity fluid composition used for a vibration energy damping device as claimed in claim 3, wherein said component (B) is an inorganic filler having a specific gravity of 3 or more.

12. A high viscosity fluid composition used for a vibration energy damping device as claimed in claim 4, wherein said component (B) is an inorganic filler having a specific gravity of 3 or more.

13. A high viscosity fluid composition used for a vibration energy damping device as claimed in claim 8, wherein said component (B) is an inorganic filler having a specific gravity of 3 or more.

14. A high viscosity fluid composition used for a vibration energy damping device as claimed in claim 9, wherein said component (B) is an inorganic filler having a specific gravity of 3 or more.

15. A high viscosity fluid composition used for a vibration energy damping device as claimed in claim 2, wherein said high viscosity fluid composition contains an antioxidant.

16. A high viscosity fluid composition used for a vibration energy damping device as claimed in claim 3, wherein said high viscosity fluid composition contains an antioxidant.

17. A high viscosity fluid composition used for a vibration energy damping device as claimed in claim 4, wherein said high viscosity fluid composition contains an antioxidant.

18. A high viscosity fluid composition used for a vibration energy damping device as claimed in claim 5, wherein said high viscosity fluid composition contains an antioxidant.

19. A high viscosity fluid composition used for a vibration energy damping device as claimed in claim 8, wherein said high viscosity fluid composition contains an antioxidant.

20. A high viscosity fluid composition used for a vibration energy damping device as claimed in claim 9, wherein said high viscosity fluid composition contains an antioxidant.

21. A vibration energy damping device as claimed in claim 7, wherein said vibration energy damping device comprises seismic damping walls, seismic damping floors or vibration absorbing devices selected from mounting devices for automobile engines, cushioning devices, stopping devices, supporting members for pipes, or vibration damping devices for girder structures.

22. A vibration energy damping device as claimed in claim 7, wherein said vibration energy damping device comprises a concave portion and a convex portion, and wherein said hydrocarbon fluid is filled in said concave portion and surrounds said convex portion.

23. A method for damping vibration energy comprising using a high viscosity fluid composition in a vibration energy damping device, wherein said high viscosity fluid comprises a high viscosity hydrocarbon fluid (A) and an inorganic filler (B).

24. A method for damping vibration energy as claimed in claim 23, wherein the specific gravity of said fluid composition is 1 or more.

25. A method for damping vibration energy as claimed in claim 23, wherein said hydrocarbon fluid comprises polybutene.

26. A method for damping vibration energy as claimed in claim 23, wherein said hydrocarbon fluid comprises a plurality of polybutenes having different average molecular weights.

27. A method for damping vibration energy as claimed in claim 26, wherein said plurality of polybutenes comprises a low molecular weight polybutene having a number average molecular weight of 1,000 to 4,000 and another polybutene having a number average molecular weight larger than 4,000.

28. A method for damping vibration energy as claimed in claim 26, wherein said plurality of polybutenes comprises a low molecular weight polybutene having a number average molecular weight of 1,000 to 4,000 a medium molecular weight polybutene having a viscosity average molecular weight of 20,000 to 70,000 and a high molecular weight polybutene having a viscosity average molecular weight of 900,000 to 2,100,000.

29. A method for damping vibration energy as claimed in claim 23, wherein said component (B) is an inorganic filler having a specific gravity of 3 or more.

30. A method for damping vibration energy as claimed in claim 23, wherein said high viscosity fluid composition contains an antioxidant.

31. A method for damping vibration energy as claimed in claim 24, wherein said component (B) is an inorganic filler having a specific gravity of 3 or more.

32. A method for damping vibration energy as claimed in claim 24, wherein said high viscosity fluid composition contains an antioxidant.

33. A method for damping vibration energy as claimed in claim 25, wherein said component (B) is an inorganic filler having a specific gravity of 3 or more.

34. A method for damping vibration energy as claimed in claim 25, wherein said high viscosity fluid composition contains an antioxidant.

35. A vibration energy damping device as claimed in claim 7, wherein said component (A) comprises a low molecular weight polybutene having a number average molecular weight of 1,000 to 4,000 and another polybutene having a number average molecular weight larger than 4,000.

36. A vibration energy damping device as claimed in claim 7, wherein said component (A) comprises a low molecular weight polybutene having a number average molecular weight of 1,000 to 4,000, a medium molecular weight polybutene having a viscosity average molecular weight of 20,000 to 70,000 and a high molecular weight polybutene having a viscosity average molecular weight of 900,000 to 2,100,000.

37. A vibration energy damping device as claimed in claim 7, wherein said component (B) is an inorganic filler having a specific gravity of 3 or more.

38. A vibration energy damping device as claimed in claim 7, wherein said high viscosity fluid composition contains an antioxidant.

39. A high viscosity fluid composition as claimed in claim 1 wherein the inorganic filler comprises zinc oxide.

40. A high viscosity fluid composition as claimed in claim 1 wherein the polybutene having the lowest number average molecular weight is present in an amount of 10 to 350 parts by weight based upon 100 parts by weight of an intermediate average molecular weight polyester.

* * * * *